US012587084B2

(12) United States Patent
Wu et al.

(10) Patent No.: US 12,587,084 B2
(45) Date of Patent: Mar. 24, 2026

(54) POWER CONVERSION SYSTEM HAVING SPREAD SPECTRUM AND PHASE SHIFTING MECHANISMS

(71) Applicant: ANPEC ELECTRONICS CORPORATION, Hsinchu (TW)

(72) Inventors: Tse-Hsu Wu, Hsinchu City (TW); Cheng-Han Wu, Hsinchu (TW); Fu-Chuan Chen, Hsinchu City (TW); Yun-Chiang Chang, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 65 days.

(21) Appl. No.: 18/907,783

(22) Filed: Oct. 7, 2024

(65) Prior Publication Data

US 2026/0005591 A1 Jan. 1, 2026

(30) Foreign Application Priority Data

Jun. 26, 2024 (TW) ................................. 113123667

(51) Int. Cl.
*H02M 1/00* (2007.01)
(52) U.S. Cl.
CPC ......... *H02M 1/0043* (2021.05); *H02M 1/007* (2021.05)
(58) Field of Classification Search
CPC ... H02M 1/0043; H02M 1/007; H02M 1/0074

USPC ........................................ 307/82; 363/65, 71
See application file for complete search history.

(56) References Cited

U.S. PATENT DOCUMENTS 7,368,959 B1 * 5/2008 Xu ....................... H02M 3/1584
327/540
2009/0237133 A1 * 9/2009 Yang ................... H02M 3/1584
327/161
2024/0333161 A1 * 10/2024 Hsiao .................... H02M 1/082

* cited by examiner

*Primary Examiner* — William Hernandez
(74) *Attorney, Agent, or Firm* — Li & Cai Intellectual Property (USA) Office

(57) ABSTRACT

A power conversion system having spread spectrum and phase shifting mechanisms is provided. Each of a plurality of power converters of the power conversion system includes a spread spectrum instructing circuit, a synchronization signal detecting circuit, an oscillator circuit and a phase shifting circuit. The oscillator circuit outputs an oscillation signal according to a spread spectrum instruction parameter from the spread spectrum instructing circuit or a synchronization detected signal from the synchronization signal detecting circuit. The phase shifting circuit shifts phases of a plurality of waveforms of the oscillation signal to generate a clock signal. The phase shifting circuit of each of the plurality of power converters outputs the clock signal to a next one of the plurality of power converters. The synchronization signal detecting circuit of each of the power converters detects the clock signal to output the synchronization detected signal.

20 Claims, 9 Drawing Sheets

POWER CONVERSION SYSTEM HAVING SPREAD SPECTRUM AND PHASE SHIFTING MECHANISMS

CROSS-REFERENCE TO RELATED PATENT APPLICATION

This application claims the benefit of priority to Taiwan Patent Application No. 113123667, filed on Jun. 26, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power conversion system having spread spectrum and phase shifting mechanisms.

BACKGROUND OF THE DISCLOSURE

Power converters are indispensable for electronic devices. The power converters are used to adjust power and supply the adjusted power to the electronic devices. However, in a conventional power converter system, the power converters cannot effectively operate, and high noise that does not meet electromagnetic interference (EMI) specifications is generated in input signals of the power converters.

SUMMARY OF THE DISCLOSURE

In response to the above-referenced technical inadequacies, the present disclosure provides a power conversion system having spread spectrum and phase shifting mechanisms. The power conversion system includes a plurality of power converters. The plurality of power converters are arranged in a predetermined order. Each of the plurality of power converters includes a spread spectrum instructing circuit, a synchronization signal detecting circuit, an oscillator circuit and a phase shifting circuit. The spread spectrum instructing circuit is configured to output a spread spectrum instruction parameter. The synchronization signal detecting circuit is configured to output synchronization detected signal. The oscillator circuit is connected to the spread spectrum instructing circuit and the synchronization signal detecting circuit. The oscillator circuit is configured to output an oscillation signal according to the spread spectrum instruction parameter or a clock signal instructed by the synchronization detected signal. The phase shifting circuit is connected to the oscillator circuit. The phase shifting circuit is configured to shift phases of a plurality of waveforms of the oscillation signal to generate the clock signal. The phase shifting circuit of each of the plurality of power converters except for a last one of the plurality of power converters outputs the clock signal to the synchronization signal detecting circuit of a next one of the plurality of power converters. The synchronization signal detecting circuit of each of the power converters detects the clock signal to output the synchronization detected signal.

As described above, the present disclosure provides the power conversion system having the spread spectrum and phase shifting mechanisms. The plurality of power converters of the power conversion system of the present disclosure are connected to each other in series. Each of the plurality of power converters of the power conversion system of the present disclosure performs the spread spectrum and phase shifting mechanisms that are different from mechanisms used in the conventional power converter. In the power conversion system of the present disclosure, the spread spectrum and phase shifting mechanisms performed by each of the plurality of power converters are used for controlling the next one of the plurality of power converters. Therefore, noise in input signals of the plurality of power converters of the power conversion system of the present disclosure can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
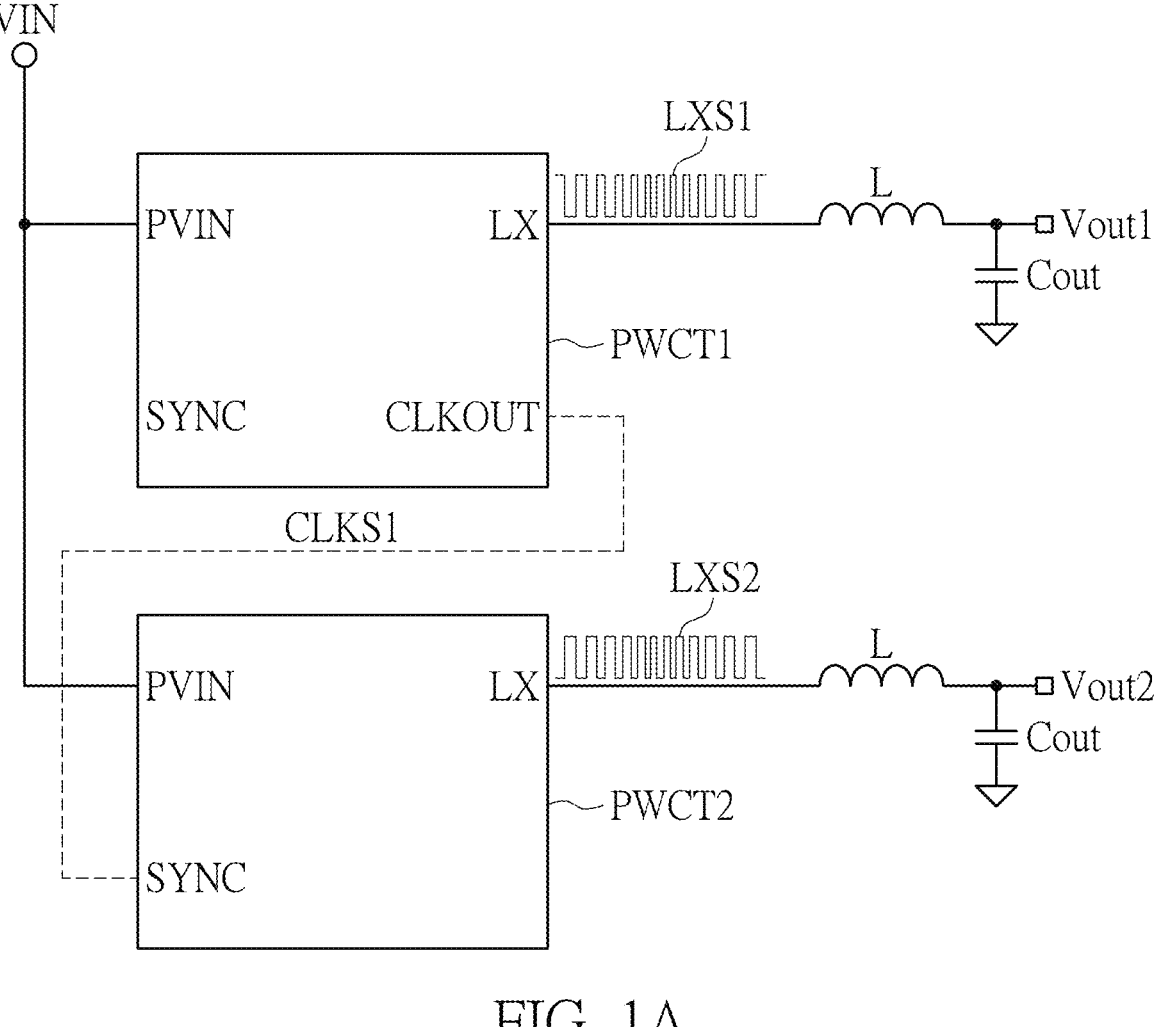
FIG. 1A is a block diagram of a plurality of power converters included in a power conversion system having spread spectrum and phase shifting mechanisms according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1B:
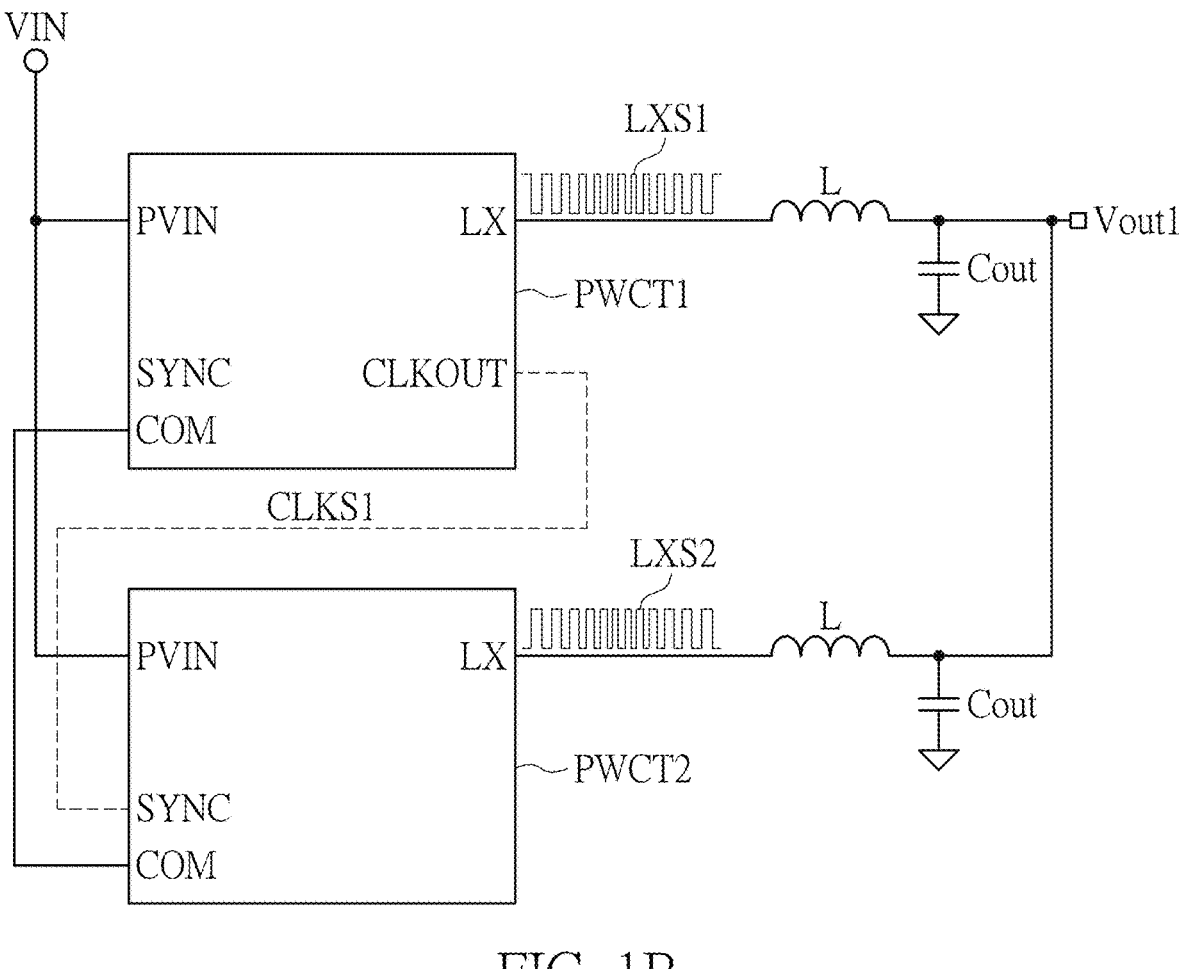
FIG. 1B is a block diagram of a plurality of power converters included in the power conversion system according to the embodiment of the present disclosure.
Figure 2:
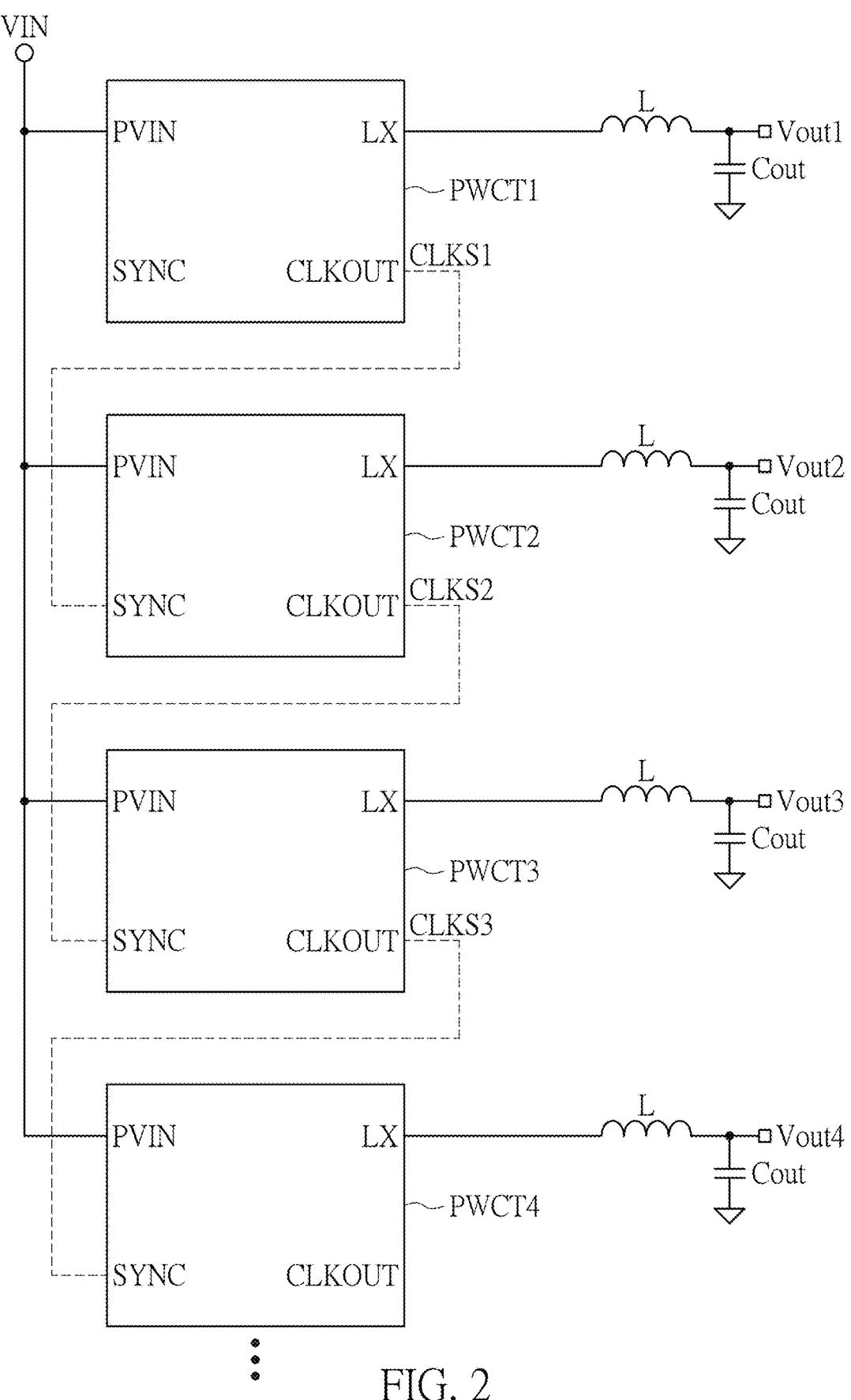
FIG. 2 is a block diagram of a plurality of power converters included in the power conversion system according to the embodiment of the present disclosure.
Figure 3:
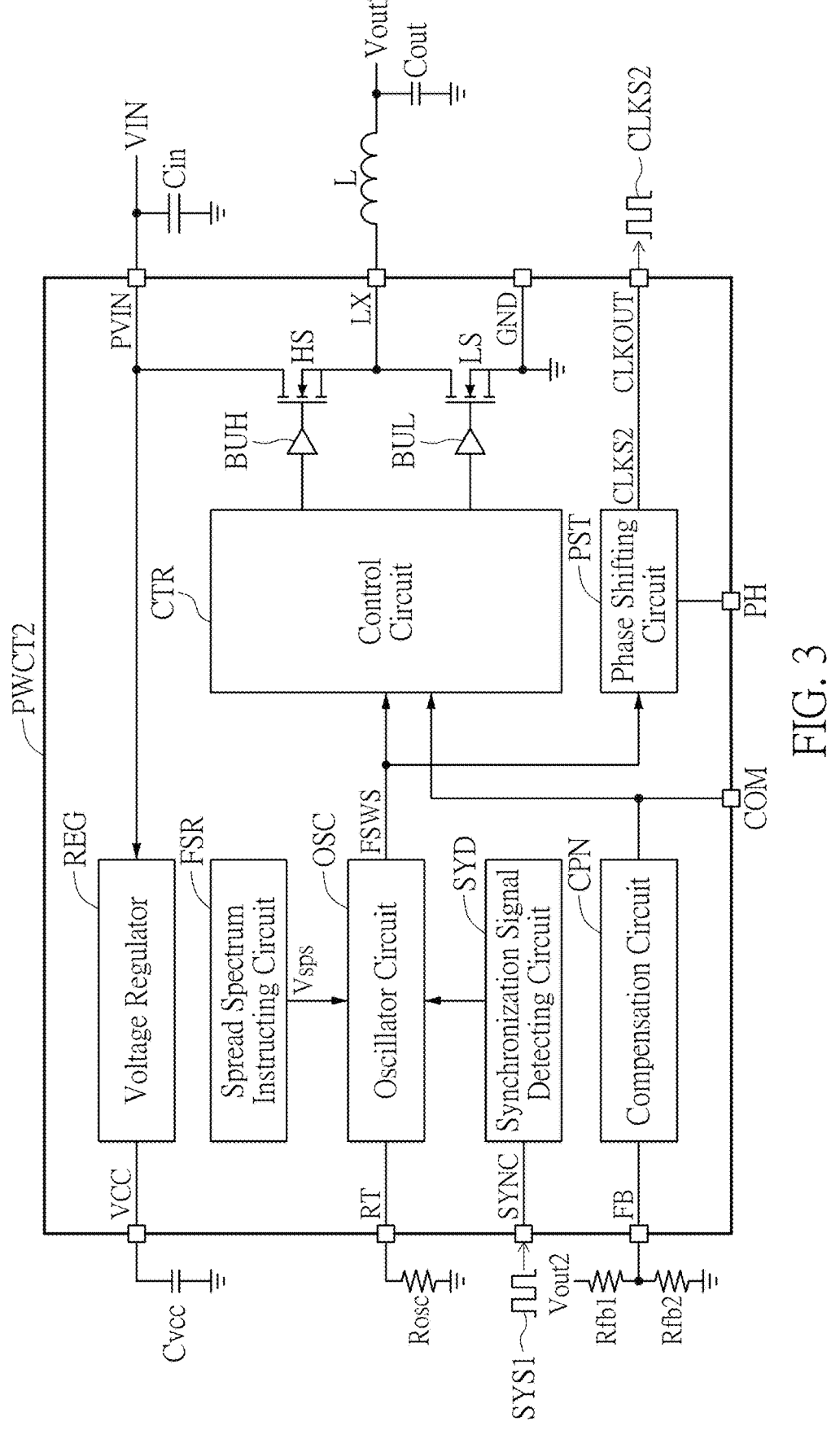
FIG. 3 is a circuit diagram of one of the plurality of power converters included in the power conversion system according to the embodiment of the present disclosure.
Figure 5:
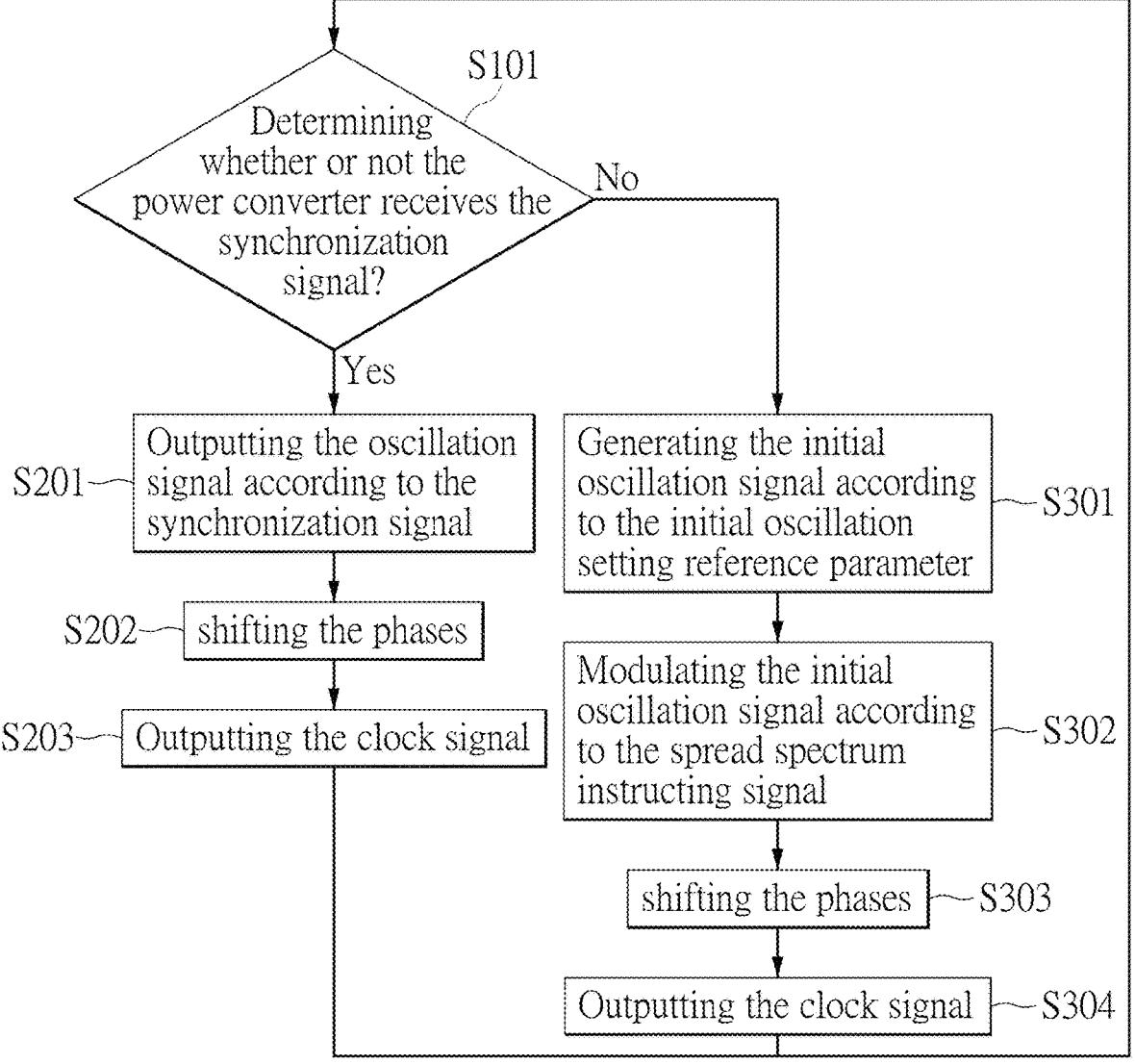
FIG. 5 is a flowchart diagram of processes performed by the power conversion system according to the embodiment of the present disclosure.

Reference is made to FIG. 1A, FIG. 1B, FIG. 2, FIG. 3 and FIG. 5, in which FIG. 1A, FIG. 1B and FIG. 2 are block diagrams of a plurality of power converters included in a power conversion system having spread spectrum and phase shifting mechanisms according to an embodiment of the present disclosure, FIG. 3 is a circuit diagram of one of the plurality of power converters included in the power conversion system according to the embodiment of the present disclosure, and FIG. 5 is a flowchart diagram of processes performed by the power conversion system according to the embodiment of the present disclosure.

The power conversion system of the present disclosure includes a plurality of power converters such as, but not limited to, two power converters PWCT1, PWCT2 shown in FIG. 1A or four power converters PWCT1 to PWCT4 shown in FIG. 2.

For example, as shown in FIG. 1A and FIG. 2, each of the plurality of power converters PWCT1 to PWCT4 may have an input power terminal PVIN, a power output terminal LX, a synchronization signal input terminal SYNC and a clock output terminal CLKOUT, but the present disclosure is not limited thereto.

The input power terminal PVIN of each of the plurality of power converters PWCT1 to PWCT4 is coupled with an input voltage VIN. The power output terminal LX of each of the plurality of power converters PWCT1 to PWCT4 is connected to a first terminal of an inductor L. A second terminal of the inductor L is connected to a first terminal of an output capacitor Cout. A second terminal of the output capacitor Cout is grounded.

As shown in FIG. 1A, the power output terminals LX of the power converters PWCT1, PWCT2 output power output signals LXS1, LXS2 to the output capacitors Cout through the inductors L for changing the output capacitors Cout to have output voltages Vout1, Vout2, respectively.

As shown in FIG. 1A, the power converters PWCT1, PWCT2 are arranged in a predetermined order and connected to each other in series. The clock output terminal CLKOUT of the power converter PWCT1 outputs a clock signal CLKS1 to the synchronization signal input terminal SYNC of the power converter PWCT2 that is arranged next to the power converter PWCT1 in the predetermined order.

As shown in FIG. 2, the plurality of power converters PWCT1 to PWCT4 are arranged in the predetermined order and connected to each other in series. The clock output terminal CLKOUT of the power converter PWCT1 outputs the clock signal CLKS1 to the synchronization signal input terminal SYNC of the power converter PWCT2 that is arranged next to the power converter PWCT1 in the predetermined order. Then, the clock output terminal CLKOUT of the power converter PWCT2 outputs a clock signal CLKS2 to the synchronization signal input terminal SYNC of the power converter PWCT3 that is arranged next to the power converter PWCT2 in the predetermined order. Then, the clock output terminal CLKOUT of the power converter PWCT3 outputs a clock signal CLKS3 to the synchronization signal input terminal SYNC of the power converter PWCT4 that is arranged next to the power converter PWCT3 in the predetermined order.

As shown in FIG. 2, the power output terminals LX of the plurality of power converters PWCT1 to PWCT4 output a plurality of power output signals to the output capacitors Cout through the inductors L, respectively. The output voltages Vout1 to Vout4 of the plurality of power converters PWCT1 to PWCT4 are charged by the plurality of power output signals, respectively. A plurality of external electronic devices may be connected respectively to the first terminals of the output capacitors Cout or the second terminals of the inductors L (that are used as output terminals of the plurality of power converters PWCT1 to PWCT4). The external electronic devices obtain power respectively from the first terminals of the output capacitors Cout or the second terminals of the inductors L.

The plurality of power converters PWCT1, PWCT2 shown in FIG. 1A and the plurality of power converters PWCT1 to PWCT4 shown in FIG. 2 do not have a common terminal COM.

In contrast, each of the plurality of power converters PWCT1, PWCT2 shown in FIG. 1B, among others thereof, has the common terminal COM in practical application. The common terminal COM of each of the plurality of power converters included in the power conversion system of the present disclosure may be connected to the common terminal COM of a next one of the plurality of power converters. As shown in FIG. 1B, the common terminal COM of the power converter PWCT1 is connected to the common terminal COM of the power converter PWCT2.

A control circuit CTR of the power converter PWCT2 shown in FIG. 3 may receive a compensation signal of a compensation circuit of the power converter PWCT1 (that is the same as a compensation circuit CPN of the power converter PWCT2) from the common terminal COM of the power converter PWCT1 shown in FIG. 1B through the common terminal COM of the power converter PWCT2 shown in FIG. 1B and FIG. 3.

As shown in FIG. 1B, the first terminal of the output capacitor Cout of the power converter PWCT1 may be connected to the first terminal of the output capacitor Cout of the power converter PWCT2 that is arranged next to the power converter PWCT1. In practice, more power converters of the power conversion system of the present disclosure may be connected to each other in the above-mentioned manner. The output voltage Vout2 of the power converter PWCT2 shown in FIG. 3 is equal to the output voltage Vout1 of the power converter PWCT1 shown in FIG. 1B. However, the output voltage Vout2 of the power converter PWCT2 shown in FIG. 3 may not be equal to the output voltage Vout1 of the power converter PWCT1 shown in FIG. 1A.

It should be understood that, the number of the power converters included in the power conversion system of the present disclosure as shown in FIG. 1A, FIG. 1B, and FIG. 2 is only an exemplification. In practice, the power conversion system of the present disclosure includes more power converters that may be configured in the above-mentioned manner. The power converters of the power conversion system of the present disclosure have the same circuit component configuration. For convenience of explanation, the circuit component configuration of only the power converter PWCT2 among the plurality of power converters of the power conversion system of the present disclosure are shown in FIG. 3.

As shown in FIG. 3, the power converter PWCT2 of the power conversion system of the present disclosure includes a spread spectrum instructing circuit FSR, a synchronization signal detecting circuit SYD, an oscillator circuit OSC and a phase shifting circuit PST. The oscillator circuit OSC is connected to the spread spectrum instructing circuit FSR, the synchronization signal detecting circuit SYD and the phase shifting circuit PST. In addition, the power converter PWCT2 may further include one or more circuit components of: a high-side switch HS, a low-side switch LS, the control circuit CTR, a high-side buffer BUH, a low-side buffer BUL, the compensation circuit CPN and a voltage regulator REG.

An input terminal of the control circuit CTR is connected to an output terminal of the oscillator circuit OSC and an output terminal of the compensation circuit CPN. An output terminal of the control circuit CTR is connected to an input terminal of the high-side buffer BUH and an input terminal of the low-side buffer BUL. An output terminal of the high-side buffer BUH is connected to a control terminal of the high-side switch HS. An output terminal of the low-side buffer BUL is connected to a control terminal of the low-side switch LS.

The synchronization signal detecting circuit SYD of each of the plurality of power converters of the power conversion system of the present disclosure detects and determines whether the power converter (e.g., the synchronization signal input terminal SYNC of the power converter) receives a clock signal to output a synchronization detected signal to the oscillator circuit OSC. For example, the synchronization signal detecting circuit SYD of the power converter PWCT2 detects and determines whether (the synchronization signal input terminal SYNC of) the power converter PWCT2 receives the clock signal CLKS1 as a synchronization signal SYS1 from the clock output terminal CLKOUT of the power converter PWCT1.

When the synchronization detected signal that is received from the synchronization signal detecting circuit SYD by the oscillator circuit OSC indicates that (the synchronization signal input terminal SYNC of) the power converter does not receive the clock signal CLKS1, the oscillator circuit OSC sets parameters such as frequencies of a plurality of waveforms of an oscillation signal FSWS based on a spread spectrum instruction parameter Vsps from the spread spectrum instructing circuit FSR and outputs the oscillation signal FSWS to the phase shifting circuit PST (and the control circuit CTR).

For example, the spread spectrum instruction parameter Vsps that is received from the spread spectrum instructing circuit FSR by the oscillator circuit OSC includes a spread spectrum instruction voltage. The oscillator circuit OSC stores a plurality of spread spectrum reference voltages and a plurality of reference frequencies. The plurality of reference frequencies respectively correspond to the plurality of spread spectrum reference voltages. The oscillator circuit OSC sets the frequency of the oscillation signal FSWS based on the reference frequency corresponding to the spread spectrum reference voltage being equal to the spread spectrum instruction voltage. For example, the oscillator circuit OSC sets the frequency of the oscillation signal FSWS to be equal to the reference frequency corresponding to the spread spectrum reference voltage being equal to the spread spectrum instruction voltage.

Conversely, when the synchronization detected signal that is received from the synchronization signal detecting circuit SYD by the oscillator circuit OSC indicates that (the synchronization signal input terminal SYNC of) the power converter receives the clock signal CLKS1, the oscillator circuit OSC uses the clock signal indicated by the synchronization detected signal from the synchronization signal detecting circuit SYD as the synchronization signal SYS1. Then, the oscillator circuit OSC sets the oscillation signal FSWS based on the synchronization signal SYS1, and outputs the oscillation signal FSWS to the phase shifting circuit PST (and the control circuit CTR).

The phase shifting circuit PST of each of the plurality of power converters except for a last one of the plurality of power converters shifts phases of the plurality of waveforms of the oscillation signal FSWS from the oscillator circuit OSC to output the clock signal though the clock output terminal CLKOUT to the synchronization signal input terminal SYNC of a next one of the plurality of power converters arranged in the predetermined order. The synchronization signal detecting circuit SYD detects the synchronization signal input terminal SYNC and obtains the clock signal from the synchronization signal input terminal SYNC.

For example, the phase shifting circuit PST may select one of the plurality of reference phase shifting angles as a target shifting phase, and may shift the phases of one or more of the plurality of the waveforms of the oscillation signal FSWS by the target shifting phase to output the clock signal. For example, as shown in FIG. 3, the phase shifting circuit PST of the power converter PWCT2 outputs the clock signal CLKS2.

In addition, the control circuit CTR may, according to the oscillation signal FSWS from the oscillator circuit OSC, output a high-side control signal to the control terminal of the high-side switch HS through the high-side buffer BUH, and may output a low-side control signal to the control terminal of the low-side switch LS through the low-side buffer BLL.

If necessary, in the power conversion system of the present disclosure, each of the plurality of power converters (including the power converter PWCT2 shown in FIG. 3) may further have an initial oscillation setting input terminal RT.

When the synchronization detected signal that is received from the synchronization signal detecting circuit SYD by the oscillator circuit OSC indicates that (the synchronization signal input terminal SYNC of) does not receive the clock signal CLKS1 (in process S101 shown in FIG. 5), the oscillator circuit OSC of the power converter PWCT2 is connected to an external initial oscillation setting circuit through the initial oscillation setting input terminal RT. At this time, the oscillator circuit OSC generates the initial oscillation signal according to the initial oscillation setting reference parameter from the external initial oscillation setting circuit (in process S301 shown in FIG. 5).

For example, the external initial oscillation setting circuit may include a resistor Rosc shown in FIG. 3, but the present disclosure is not limited thereto. The oscillator circuit OSC sets the frequencies of the plurality of waveforms of the initial oscillation signal according to a parameter such as a voltage of the resistor Rosc as the initial oscillation setting reference parameter.

After the initial oscillation signal is generated, the oscillator circuit OSC modulates the initial oscillation signal to output the oscillation signal FSWS to the phase shifting circuit PST (and the control circuit CTR) based on the spread spectrum instruction parameter Vsps instructed by a spread spectrum instructing signal from the spread spectrum instructing circuit FSR (in process S302 shown in FIG. 5). Then, the phase shifting circuit PST shifts the phases of the plurality of waveforms of the oscillation signal FSWS (in process S303 shown in FIG. 5) to output the clock signal CLKS1 (in process S304 shown in FIG. 5).

Conversely, when the synchronization detected signal that is received from the synchronization signal detecting circuit SYD by the oscillator circuit OSC indicates that (the synchronization signal input terminal SYNC of) the power converter receives the clock signal CLKS1 (in process S101 shown in FIG. 5), the oscillator circuit OSC obtains the clock signal CLKS1 indicated by the synchronization detected signal as the synchronization signal SYS1 and outputs the oscillation signal FSWS to the phase shifting circuit PST (and the control circuit CTR) according to the synchronization signal SYS1 (in process S201 shown in FIG. 5). Then, the phase shifting circuit PST shifts the phases of waveforms of the oscillation signal FSWS (in process S202 shown in FIG. 5) to output the clock signal CLKS2 (in process S203 shown in FIG. 5).

In the power conversion system of the present disclosure, each of the plurality of power converters (including the power converter PWCT2 shown in FIG. 3) may further have a phase instruction terminal PH, a feedback input terminal FB, a ground terminal GND, a common power source terminal VCC, the common terminal COM, or any combination thereof.

External circuit components outside the power converter of the power conversion system of the present disclosure may be grounded through the ground terminal GND. The control circuit CTR of the power converter of the power conversion system of the present disclosure may be connected to an external instruction issuing circuit through the common terminal COM. The control circuit CTR may operate according to instructions from the external instruction issuing circuit.

A first terminal of the high-side switch HS is coupled with the input voltage VIN through the input power terminal PVIN, or is connected to an input capacitor Cin through the input power terminal PVIN and receives a voltage of the input capacitor Cin being charged by the input voltage VIN.

A first terminal of the voltage regulator REG may be coupled with the input voltage VIN through the input power terminal PVIN. A second terminal of the voltage regulator REG may be connected to a common capacitor Cvcc through the common power source terminal VCC. The voltage regulator REG may regulate the input voltage VIN to output a charging current that is used to charge the common capacitor Cvcc or other external circuit components (that are not shown in figures).

A first terminal of the low-side switch LS is connected to a second terminal of the high-side switch HS. A node between the first terminal of the low-side switch LS and the second terminal of the high-side switch HS is connected to the first terminal of the inductor L through the power output terminal LX. A second terminal of the low-side switch LS is grounded. A node between the second terminal of the inductor L and the first terminal of the output capacitor Cout may be directly connected to the feedback input terminal FB, or may be connected to the feedback input terminal FB through a voltage divider circuit (including a first voltage dividing resistor Rfb1 and a second voltage dividing resistor Rfb2 as shown in FIG. 2). The feedback input terminal FB is connected to the compensation circuit CPN. A first terminal of the first voltage dividing resistor Rfb1 is connected to the node between the second terminal of the inductor L and the first terminal of the output capacitor Cout. A second terminal of the first voltage dividing resistor Rfb1 is connected to a first terminal of the second voltage dividing resistor Rfb2. A second terminal of the second voltage dividing resistor Rfb2 is grounded.

The compensation circuit CPN may, according to the output voltage Vout2 or a divided voltage thereof (that is a voltage of the first terminal of the second voltage dividing resistor Rfb2), output the compensation signal to the control circuit CTR, and may output the compensation signal to other circuits through the common terminal COM. The control circuit CTR may, according to the compensation signal, output the high-side control signal to the control terminal of the high-side switch HS through the high-side buffer BUH, and may output the low-side control signal to the control terminal of the low-side switch LS through the low-side buffer BLL.

Figure 4:
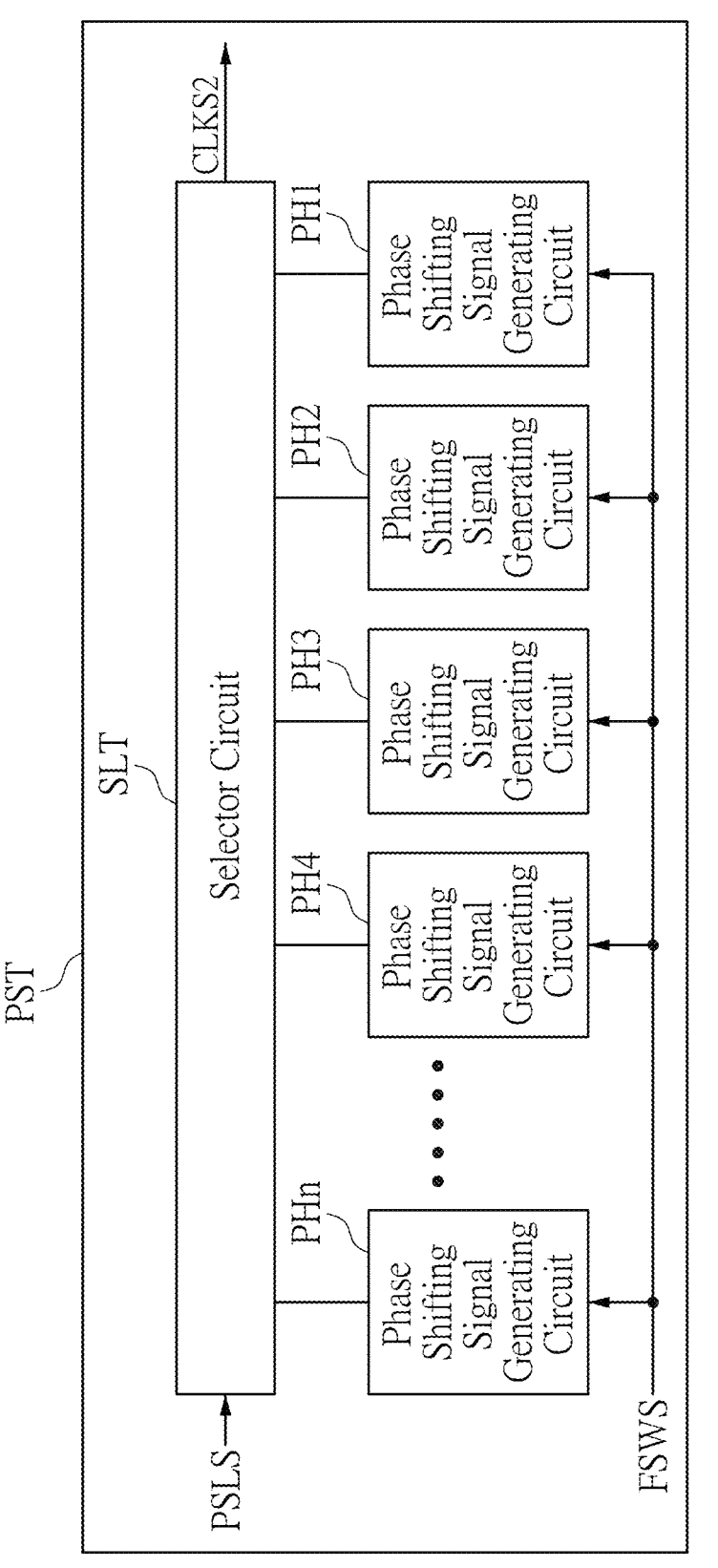
FIG. 4 is a block diagram of a plurality of phase shifting signal generating circuits and a selector circuit that are included in the one of the plurality of power converters of the power conversion system according to the embodiment of the present disclosure.

Reference is made to FIG. 3 and FIG. 4, in which FIG. 4 is a block diagram of a plurality of phase shifting signal generating circuits and a selector circuit that are included in the one of the plurality of power converters of the power conversion system according to the embodiment of the present disclosure.

For example, the phase shifting circuit PST shown in FIG. 3 may include a plurality of phase shifting signal generating circuits PH1 to PHn and a selector circuit SLT as shown in FIG. 4.

Each of the plurality of phase shifting signal generating circuits PH1 to PHn receives the oscillation signal FSWS from the oscillator circuit OSC. The plurality of phase shifting signal generating circuits PH1 to PHn shift the phase of the oscillation signal FSWS respectively by a plurality of target shifting phases to respectively output a plurality of clock signals to the selector circuit SLT (according to a phase shifting selection instructing signal PSLS that is received from a phase shifting selection instructing circuit through the phase instruction terminal PH as shown in FIG. 3). The plurality of target shifting phases are different from each other. For example, the plurality of target shifting phases may respectively be 60, 90, 120, 180 . . . (360/N), where N is any appropriate positive value.

The selector circuit SLT may include a multiplexer, but the present disclosure is not limited thereto. The selector circuit SLT is connected to the plurality of phase shifting signal generating circuits PH1 to PHn. The selector circuit SLT of each of the plurality of power converters except for a last one of the plurality of power converters arranged in the predetermined order selects one of the plurality of clock signals and outputs the one of the plurality of clock signals to the synchronization signal detecting circuit SYD of a next one of the plurality of power converters arranged in the predetermined order. For example, the selector circuit SLT of the power converter PWCT2 as shown in FIG. 3 and FIG. 4 outputs the clock signal CLKS2 to the synchronization signal detecting circuit SYD of the power converter PWCT3 that is arranged next to the power converter PWCT2 in the predetermined order as shown in FIG. 2.

Figure 6:
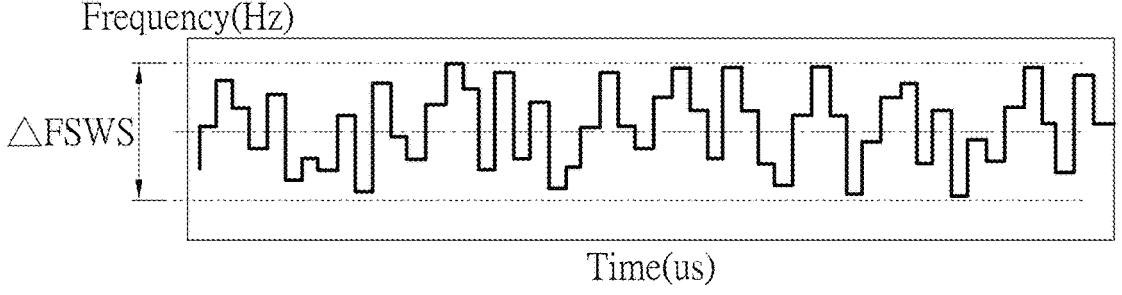
FIG. 6 is a waveform diagram of a signal of the power converter of the power conversion system according to the embodiment of the present disclosure.
Figure 7:
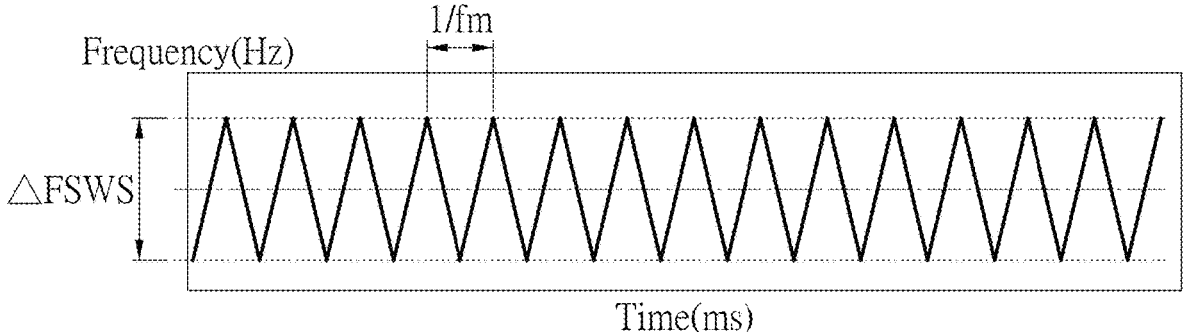
FIG. 7 is a waveform diagram of a signal of the power converter of the power conversion system according to the embodiment of the present disclosure.

Reference is made to FIG. 6 and FIG. 7, which are waveform diagrams of a signal of the power converter of the power conversion system according to the embodiment of the present disclosure.

The plurality of waveforms of the oscillation signal FSWS outputted by the oscillation signal FSWS shown in FIG. 3 may include a plurality of staircase waveforms that have different heights as shown in FIG. 6, or may include a plurality of triangle waveforms as shown in FIG. 7, but the present disclosure is not limited thereto. As shown in FIG. 7, a period of the plurality of triangle waveforms may be 1/fm, where fm represents the frequency of the oscillation signal FSWS. In practice, the oscillator circuit OSC may generate other types of waveforms in the oscillation signal FSWS.

Figures 8, 9, 10, 11:
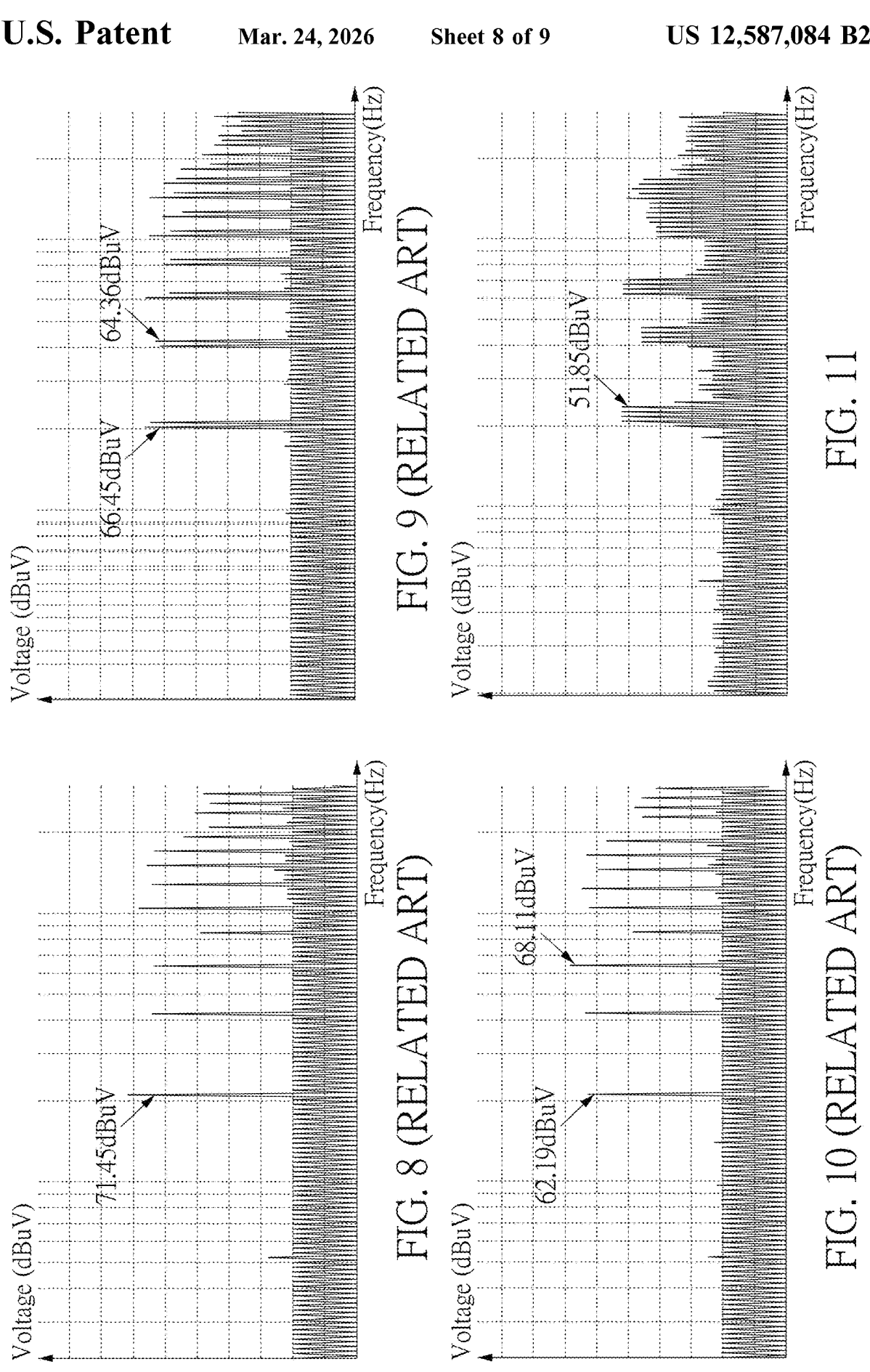
FIG. 8 is a waveform diagram of a signal of a conventional power converter.
FIG. 9 is a waveform diagram of a signal of the conventional power converter.
FIG. 10 is a waveform diagram of a signal of the conventional power converter.
FIG. 11 is a waveform diagram of a signal of the power converter of the power conversion system according to the embodiment of the present disclosure.
Figure 12:
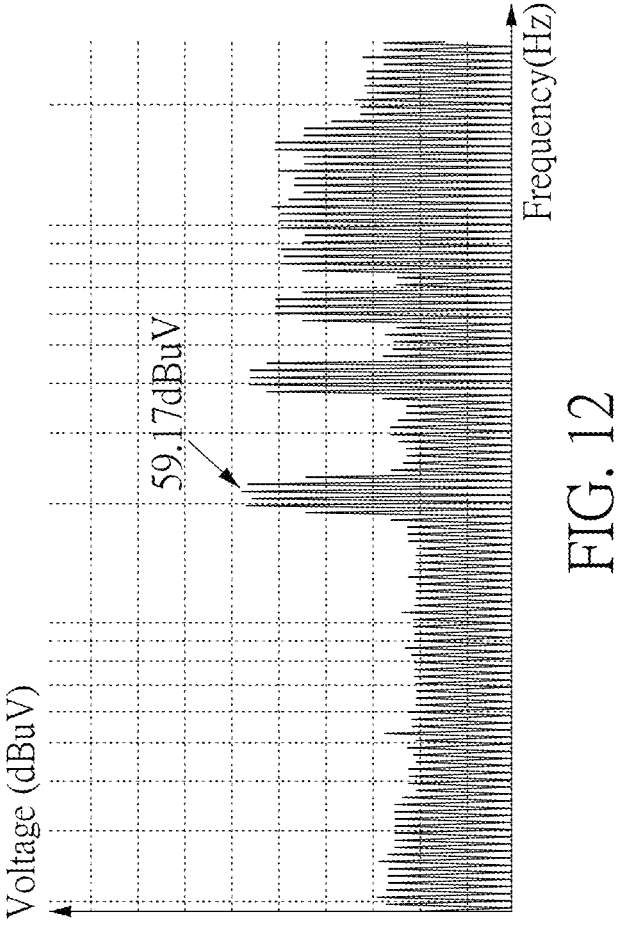
FIG. 12 is a waveform diagram of a signal of the power converter of the power conversion system according to the embodiment of the present disclosure.

Reference is made to FIG. 8 to FIG. 12, in which FIG. 8 to FIG. 10 are waveform diagrams of a signal of a conventional power converter, and FIG. 11 and FIG. 12 are waveform diagrams of a signal of the power converter of the power conversion system according to the embodiment of the present disclosure.

When a frequency of a synchronization signal of each of a plurality of power converters that are connected to each other in series in the conventional power converter is 2.1 MHz, the conventional power converter generates a noise signal in which a peak voltage of one of a plurality of waveforms reaches 71.45 dBuV as shown in FIG. 8. When the plurality of power converters of the conventional power converter do not synchronously operate, peak voltages of two of a plurality of waveforms of a noise signal generated by the conventional power converter respectively reach 66.45 dBuV and 64.36 dBuV as shown in FIG. 9. When the frequency of the synchronization signal of each of the plurality of power converters that are connected to each other in series in the conventional power converter is 2.1 MHz and a phase of the synchronization signal of the conventional power converter is shifted by an angle of 180, the conventional power converter generates a noise signal in which the peak voltages of two of the plurality of waveforms respectively reach 62.19 dBuV and 68.11 dBuV as shown in FIG. 10 or a peak voltage of one of a plurality of triangle waveforms reaches 59.17 dBuV as shown in FIG. 12.

In contrast, as shown in FIG. 11, a highest voltage of a noise signal of the power conversion system of the present disclosure only reaches 51.85 dBuV. It is apparent that, noise generated by the power conversion system of the present disclosure is smaller than noise generated by the conventional power converter.

In conclusion, the present disclosure provides the power conversion system having the spread spectrum and phase shifting mechanisms. The plurality of power converters of the power conversion system of the present disclosure are connected to each other in series. Each of the plurality of power converters of the power conversion system of the present disclosure performs the spread spectrum and phase shifting mechanisms that are different from mechanisms used in the conventional power converter. In the power conversion system of the present disclosure, the spread spectrum and phase shifting mechanisms performed by each of the plurality of power converters are used for controlling the next one of the plurality of power converters. Therefore, the noise in the input signals of the plurality of power converters of the power conversion system of the present disclosure can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power conversion system having spread spectrum and phase shifting mechanisms, comprising:
   a plurality of power converters arranged in a predetermined order, wherein each of the plurality of power converters includes:
      a spread spectrum instructing circuit configured to output a spread spectrum instruction parameter;
      a synchronization signal detecting circuit configured to output a synchronization detected signal;
      an oscillator circuit connected to the spread spectrum instructing circuit and the synchronization signal detecting circuit, and configured to output an oscillation signal according to the spread spectrum instruction parameter or a clock signal instructed by the synchronization detected signal; and
      a phase shifting circuit connected to the oscillator circuit, and configured to shift phases of a plurality of waveforms of the oscillation signal to generate the clock signal;
   wherein the phase shifting circuit of each of the plurality of power converters except for a last one of the plurality of power converters outputs the clock signal to the synchronization signal detecting circuit of a next one of the plurality of power converters;
   wherein the synchronization signal detecting circuit of each of the power converters detects the clock signal to output the synchronization detected signal.

2. The power conversion system according claim 1, wherein each of the plurality of power converters has a synchronization signal input terminal, and the synchronization signal detecting circuit of each of the plurality of power converters detects the synchronization signal input terminal and determines whether the synchronization signal input terminal receives the clock signal to output the synchronization detected signal.

3. The power conversion system according claim 2, wherein each of the plurality of power converters has a clock output terminal, and the phase shifting circuit of each of the plurality of power converters outputs the clock signal to the clock output terminal;

wherein the synchronization signal input terminal of each of the plurality of power converters except for a first one of the plurality of power converters receives the clock signal from the clock output terminal of a previous one of the plurality of power converters.

4. The power conversion system according claim 1, wherein, when the synchronization signal detecting circuit does not receive the clock signal, the oscillator circuit outputs the oscillation signal according to the spread spectrum instruction parameter.

5. The power conversion system according claim 1, wherein, when the synchronization signal detecting circuit receives the clock signal, the oscillator circuit outputs the oscillation signal according to the clock signal.

6. The power conversion system according claim 1, wherein the oscillator circuit generates an initial oscillation signal according to an initial oscillation setting reference parameter from an external initial oscillation setting circuit;

wherein, when the synchronization signal detecting circuit does not receive the clock signal, the oscillator circuit modulates the initial oscillation signal to output the oscillation signal according to the spread spectrum instruction parameter;

wherein, when the synchronization signal detecting circuit receives the clock signal, the oscillator circuit modulates the initial oscillation signal to output the oscillation signal according to the clock signal.

7. The power conversion system according claim 6, wherein each of the plurality of power converters has an initial oscillation setting input terminal, and the oscillator circuit of each of the plurality of power converters is connected to the external initial oscillation setting circuit through the initial oscillation setting input terminal.

8. The power conversion system according claim 6, wherein the external initial oscillation setting circuit includes a resistor, and the oscillator circuit sets frequencies of a plurality of waveforms of the initial oscillation signal according to a parameter of the resistor as the initial oscillation setting reference parameter.

9. The power conversion system according claim 1, wherein the phase shifting circuit selects one of a plurality of reference phase shifting angles as a target shifting phase, and shifts a phase of each of the plurality of waveforms of the oscillation signal by the target shifting phase to output the clock signal.

10. The power conversion system according claim 1, wherein the phase shifting circuit includes:

a plurality of phase shifting signal generating circuits, wherein each of the plurality of phase shifting signal generating circuits receives the oscillation signal, and the plurality of phase shifting signal generating circuits shift the oscillation signal respectively by a plurality of target shifting phases to respectively output a plurality of clock signals; and a selector circuit connected to the plurality of phase shifting signal generating circuits, wherein the selector circuit of each of the plurality of power converters except for the last one of the plurality of power converters selects one of the plurality of clock signals and outputs the one of the plurality of clock signals to the synchronization signal detecting circuit of a next one of the plurality of power converters.

11. The power conversion system according claim 10, wherein the selector circuit of each of the plurality of power converters except for the last one of the plurality of power converters, according to a phase shifting selection instructing signal from an external phase shifting instructing circuit, selects one of the plurality of clock signals and outputs the one of the plurality of clock signals to the synchronization signal detecting circuit of a next one of the plurality of power converters.

12. The power conversion system according claim 10, wherein the selector circuit includes a multiplexer.

13. The power conversion system according claim 1, wherein the spread spectrum instruction parameter outputted by the spread spectrum instructing circuit includes a spread spectrum instruction voltage, the oscillator circuit stores a plurality of spread spectrum reference voltages and a plurality of reference frequencies, the plurality of reference frequencies respectively correspond to the plurality of spread spectrum reference voltages, and the oscillator circuit sets a frequency of the oscillation signal according to the reference frequency corresponding to the spread spectrum reference voltage being equal to the spread spectrum instruction voltage.

14. The power conversion system according claim 1, wherein each of the plurality of power converters further includes:

a high-side switch, wherein a first terminal of the high-side switch is coupled with an input voltage;

a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, and a second terminal of the output capacitor is grounded; and a control circuit connected to the oscillator circuit, a control terminal of the high-side switch and a control terminal of the low-side switch, and configured to control the high-side switch and the low-side switch according to the oscillation signal.

15. The power conversion system according claim 14, wherein each of the plurality of power converters has a power output terminal, and a signal is transmitted from the node between the first terminal of the low-side switch and the second terminal of the high-side switch through the power output terminal to the inductor.

16. The power conversion system according claim 14, wherein each of the plurality of power converters further includes:

a high-side buffer, wherein an input terminal of the high-side buffer is connected to an output terminal of the control circuit, and an output terminal of the high-side buffer is connected to the control terminal of the high-side switch.

17. The power conversion system according claim 14, wherein each of the plurality of power converters further includes:

a low-side buffer, wherein an input terminal of the low-side buffer is connected to an output terminal of the control circuit, and an output terminal of the low-side buffer is connected to the control terminal of the low-side switch.

18. The power conversion system according claim 14, wherein each of the plurality of power converters further includes:

a compensation circuit connected to the control circuit, wherein the compensation circuit outputs a compensation signal, and the control circuit controls the high-side switch and the low-side switch according to the compensation signal.

19. The power conversion system according claim 18, wherein each of the plurality of power converters has a feedback input terminal, and the compensation circuit receives an output voltage between the second terminal of the inductor and the first terminal of the output capacitor through the feedback input terminal and outputs the compensation signal according to the output voltage.

20. The power conversion system according claim 19, wherein a voltage divider circuit is connected to the second terminal of the inductor and the first terminal of the output capacitor, the voltage divider circuit divides the output voltage to output a divided voltage, the compensation circuit receives the divided voltage through the feedback input terminal, and the compensation circuit outputs the compensation signal according to the divided voltage.

* * * * *